United States Patent [19]

Mostyn et al.

[11] Patent Number: 4,855,722
[45] Date of Patent: Aug. 8, 1989

[54] ALTERNATING CURRENT POWER LOSS DETECTOR

[75] Inventors: Graham Y. Mostyn, Saratoga; Mohammad Yunus, Fremont, both of Calif.

[73] Assignee: Intersil, Inc., Santa Clara, Calif.

[21] Appl. No.: 892,702

[22] Filed: Aug. 1, 1986

[51] Int. Cl.$^4$ .................................... G08B 21/00
[52] U.S. Cl. ............................ 340/660; 340/661; 340/663
[58] Field of Search ............... 340/660, 661, 663; 361/92; 307/351, 354, 464, 200 A, 296 R

[56] References Cited

U.S. PATENT DOCUMENTS

| 3,836,854 | 9/1974 | Wehman | 340/663 |
| 4,099,068 | 7/1978 | Kobayashi et al. | 361/92 |
| 4,228,429 | 10/1980 | Tsuchiya et al. | 340/661 |
| 4,567,539 | 1/1986 | Sinberg | 340/663 |
| 4,594,517 | 6/1986 | Cohen et al. | 361/92 |
| 4,642,616 | 2/1987 | Goodwin | 340/663 |

Primary Examiner—Donald J. Yusko
Assistant Examiner—Tyrone Queen
Attorney, Agent, or Firm—Henry I. Schanzer; W. Joseph Schanzer

[57] ABSTRACT

The duration of time during which an AC power voltage sinusoidal waveform remains between negative voltage threshold $-V1$ volts, nominally 5% of negative peak voltage $-V2$ volts, and positive voltage threshold $+V1$ volts, nominally 5% of peak positive voltage $+V2$ volts, is detected. By the change in voltage with time exhibited by a sinusoidal waveform in the region of zero voltage crossing, the expected time duration between voltage thresholds in approximately 5% of one-half period of such sinusoidal waveform. If the actual time between voltage thresholds exceeds (nominally) twice this value, or 10% of one-half period, then a power black-out condition is sensed, and a power fault signal is produced.

15 Claims, 3 Drawing Sheets

ALTERNATING CURRENT POWER LOSS DETECTOR

BACKGROUND OF THE INVENTION

1. Field of the Invention

The present invention deals generally with the early detection of power failure resultant from the loss of alternating current (AC) power supplied to an electrical system.

2. Background Description

Many electrical and electronic systems using alternating current, AC, power require early notification of the failure of such power so that orderly cessation of operations can be accomplished. For example, in computer systems with volatile memory a timely warning of a primary power outage is often used to initiate the transfer of the contents of volatile memory stores to nonvolatile memory stores. The contents can be subsequently retrieved from the nonvolatile stores upon resumption of adequate power to support processing.

Loss of the alternating current power satisfactory to operate electrical and electronic systems can occur in two basic ways: a "brown-out" characterized by reduced AC amplitude, or a "black-out" characterized by a sudden and complete loss of power. Detection of both occurrences as soon as possible is beneficial in order to give the system maximum time to respond to what is normally considered an undesired and unscheduled failure event.

In one previous method of detecting the failure of alternating current power, the peaks of the alternating current power voltage waveform are monitored. Normally the voltage waveform is half-wave rectified, and the half-wave rectified voltage waveform is sensed to determine if the waveform crosses a single voltage threshold. This threshold is of a voltage value substantially equal to the normal maximum voltage magnitude and is normally crossed in each direction twice during each complete cycle. This method is generally satisfactory for detecting a power "brown-out", which is defined as a condition in which the peak of the power voltage waveform fails to reach its full normal voltage excursion. However, in the event of a complete loss of AC power, a peak detection method generally does not provide a power interruption alarm any sooner than one-half cycle after the last occurring peak, irrespective of the point in the cycle at which one half cycle for a 60 Hertz alternating current waveform is 8 milliseconds in duration, the sudden loss of alternating current may not be detected by a peak-detecting AC power failure detector until up to 8 milliseconds after the actual interruption of power. For electronic systems in which processing operations are typically conducted within microseconds, an 8 millisecond interval may be too long to prevent loss or corruption of data. If an earlier detection of the complete interruption of alternating current power could be accomplished, then the electrical or electronic system using such power could be earlier alerted of the power interruption and could be accorded more time in which to effect an orderly cessation of those ongoing operations dependent upon such power.

One previous system directed to the detection of a power failure within a fraction of a cycle to enable the contents of a volatile memory to be converted into a nonvolatile form before loss occurs is described in U.S. Pat. No. 3,937,937 for PRIMARY POWER FAULT DETECTOR to McVey. The circuit of McVey detects both voltage and current in order to calculate within an integrated circuit multiplier device the root mean square (RMS) power as the product of such detected voltage and current. If the power fails, the calculated RMS power will equal zero, providing an indication of the loss of power.

Another previous system for detecting the interruption of power is described in U.S. Pat. No. 4,473,756 for AC UNINTERRUPTIBLE POWER SYSTEM to Bridgen et al. In Bridgen et al., a dual line sensor circuit compares the normal AC power line signal (transformer coupled) with a reference AC signal, and under normal line conditions delivers a logic "one" state signal to a switch control circuit and to an alternate power control circuit. When the input AC power signal and the reference AC signal are not in agreement, then the power is assumed to either have failed or degraded. Upon such a failure or degradation a switch is first opened for disconnection of the failed or degraded power, and then, after a short delay, an alternate power source will be coupled to the electronic system. Such detection, as well as provision of uninterruptible AC power, depends upon the availability of a second, independent, reference AC signal.

Other types of power loss detectors utilize zero crossing detectors. In U.S. Pat. No. 3,955,102 for ZERO CROSSING DETECTION CIRCUIT to Chi, an input signal is applied to both positive and negative threshold circuits which are each connected to respective one-shot circuits. The output pulses of both one-shots are applied to a NOR circuit, thereby responding to the beginning edges but not to the trailing edges of signals. Accordingly, variations due to hysteresis or to varying propagation time in the trailing edges of the signal for which zero crossing is being detected do not affect the detection of the zero crossing.

In U.S. Pat. No. 4,229,669 for TIGHT TOLERANCE ZERO CROSSING DETECTOR CIRCUIT to Smith, a zero crossing detector provides an optically coupled output signal at the zero crossing time. A complex impedance matching circuit is provided to enable tight tolerance detection of zero crossing, which is particularly useful for the recognized advantage of switching loads at or near the zero crossing point of the power supply waveform.

Finally, in U.S. Pat. No. 4,480,200 for ZERO-CROSSING POINT DETECTION CIRCUIT to Tan et al., the upward and downward transitions of an input signal are independently detected with Schmitt trigger circuits which are asymmetrical in different directions with respect to the hysteresis of the waveform. The detection signals from the Schmitt triggers are then combined in an exclusive OR circuit to provide zero crossing level detection having no time lag and substantial immunity to small noise signals.

SUMMARY OF THE INVENTION

The present invention provides a method and apparatus for improved early detection of the loss of alternating current (AC) power. In one embodiment, the period of time that the alternating current voltage waveform is proximate to its zero crossings is monitored. If such time exceeds a predetermined reference period, a power failure alarm is given.

Specifically, under normal conditions, a typical alternating current power voltage waveform will pass through zero volts instantaneously, remaining close to zero volts for but a very short period of time each cycle. In a sinusoidal, alternating current, power voltage waveform the change of voltage per unit time is greatest at the zero crossings. In the method and apparatus of one embodiment of the present invention, two small voltage thresholds are defined on either side of zero volts. Under normal power supply conditions, the alternating current power voltage waveform requires but a short period of time to cross one threshold and to reach the other. However, in the case of a black-out interruption of power, the power voltage waveform will immediately fall to a voltage value between the two thresholds and remain there. The time period between crossings of the thresholds is monitored using a timer. A power interruption alarm is given when the input power voltage waveform is determined to have remained between the voltage thresholds for longer than a predetermined reference time.

Choice of the actual voltage thresholds and of the predetermined reference time is influenced by power offset voltages and by power noise. Although the method of the present invention could potentially give almost instantaneous warning of power loss, in practice a system with good immunity to noise can be established with voltage thresholds equalling 5% of the peak voltage. These thresholds result in an AC power loss detection time of approximately 10% of one half-period. This is approximately 10 times better than the worst-case performance of many previous methods of detecting power loss through peak detections of the voltage waveform.

The implementation of the invention in one illustrated embodiment includes a window comparator circuit which detects the time that the power signal waveform remains near the zero crossing and between the positive and negative voltage threshold. The embodiment further includes an alarm timer circuit which detects if such time is greater than a predetermined reference time. If so, the alarm timer circuit signals the detection of a black-out power fault.

Correspondingly, it is a first object of the present invention to improve the speed of detection of the complete loss, or black-out, of alternating current power.

It is a second object of the present invention to detect AC power black-out loss, or fault with a satisfactory degree of immunity to noise in order to minimize false alarms.

It is a third object of the present invention that the circuit apparatus embodying the invention should be economical of implementation, reliable in operation, and without substantial failure modes resulting in the degradation or interruption of the very AC power which is monitored for degradation or interruption.

It is a fourth object of the present invention that the circuit apparatus of the invention should automatically reset, producing a signal that indicates that input AC power is not in a black-out fault condition, as soon as such power should assume, or reassume, normal levels.

These and other objects of the present invention will become increasingly clear as the below-described embodiment of the invention is explained with reference to the drawings within the following sections.

BRIEF DESCRIPTION OF THE DRAWINGS

FIG. 3b shows voltage waveforms of pertinence to the of the circuit apparatus of FIG. 3a.

FIG. 4b shows a diagram of voltage waveforms of pertinence to the operation of the circuit apparatus of FIG. 4a.

DESCRIPTION OF THE ILLUSTRATED EMBODIMENT

The present invention provides a method, and circuit apparatus, for detection of the total loss, or cessation, of input alternating current (AC) power to an electrical or electronic device. It is important to detect the interruption of AC power in order to be able to alert an electrical or electronic device using the AC power to this occurrence. After such an alert the electrical or electronic device may subsequently engage in sequenced operations pertinent to such orderly cessation of function as is appropriate in the absence of input AC power. For example, a computer encountering a power fault alarm, that is, a detected interruption or degradation of input AC power, often continues to operate upon energy stored in the capacitances and inductances of the power supply to such computer for some number of milliseconds. Such time period is sufficiently long that, for example, a computer operating at microsecond instruction execution times may accomplish considerable useful work and preparatory action between the time that a power fault alarm is received and that later time upon which internal power within the computer degrades to an unusable level.

Regardless of the sophistication or amount of continuing operations, such as computing, which are to be or which are desired to be performed in the event of the detection of an input power failure, it is usually desirable to promptly sense a power failure condition. Prompt sensing allows for (1) necessary action to be earlier and more reliably engaged in, (2) the total available time within which such action may be accomplished to be maximally lengthened, and (3) automated switchover to an alternative, back-up, alternating current power supply source while the load remains energized. The present invention is directed to the timely detection of, and resultant generation of a power fault alarm from, a complete loss of alternating current power.

Figure 1A:
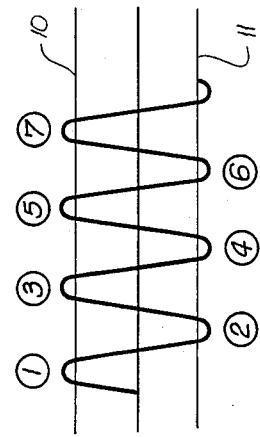
FIG. 1a shows a waveform representing an occurrence of a "brown-out" fault condition of alternating current power.
Figure 1B:
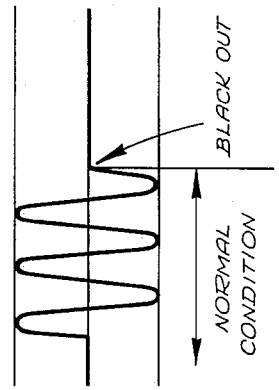
FIG. 1b shows a waveform representing an occurrence of a "black-out" fault condition of alternating current power.

The deterioration of AC power can occur in the two ways illustrated in FIG. 1a and FIG. 1b A "brown-out" occurrence illustrated in FIG. 1a is characterized by reduced amplitude of the AC power. A "black-out" occurrence shown in FIG. 1b means a sudden and complete loss of AC power voltage and energy. Detection of both AC power deterioration occurrences as early as is possible is important.

Figure 1C:
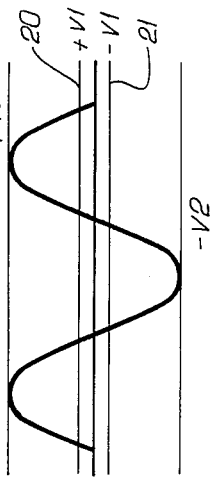
FIG. 1c shows an alternating current power voltage waveform with successive crossings of near-peak voltage thresholds by both the positive and negative peaks of such waveform.

One previous method of detecting both occurrences of AC power deterioration is in accordance with the illustration of FIG. 1c. An upper, positive, voltage threshold 10 and a lower, negative voltage threshold 11 are set as levels which will be crossed by the respective positive and negative peaks of the AC power voltage waveform. The actual apparatus for detecting the crossings of the positive and negative voltage thresholds employs a full wave rectifier. Then a voltage comparator is used to detect the successive crossings of a single voltage threshold by the full wave rectified AC power voltage waveform. The voltage comparator effectively detects the alternate successive crossings of the upper and the lower voltage thresholds by the successive positive and negative peaks of the voltage waveform, crossings numbered 1–7 in FIG. 1c. If a period of more than one-half cycle of the AC waveform, or approximately 8 milliseconds for 60 Hertz power, elapses between crossings, then an alarm is signaled.

This peak threshold crossing detection system is generally satisfactory for the detection of the "brown-out" AC power deterioration condition illustrated in FIG. 1a. The occurrence of the "brown-out" power failure condition will be sensed at the earliest possible moment. It is not intended that the method and apparatus of the present invention should completely supplant this previous positive and negative peak voltage detection system using a full wave rectifier and voltage comparator. Rather, this prior art system may be operated in parallel with the apparatus of the present invention which is particularly directed to the timely detection of the "black-out" power deterioration condition illustrated in FIG. 1b.

Figure 2A:
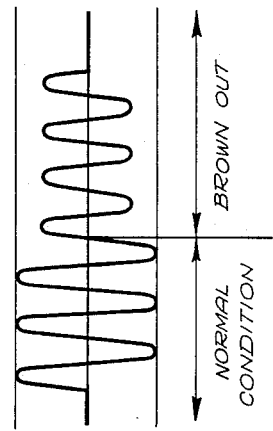
FIG. 2a shows a waveform representing a best case occurrence for the early detection by one prior method of a "blackout" power fault condition.
Figure 2B:
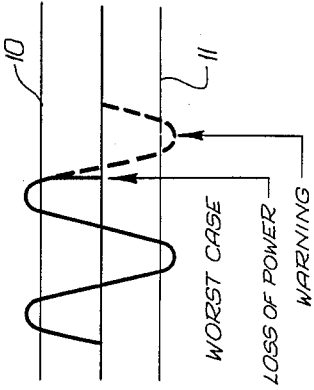
FIG. 2b shows a waveform representing a worst case occurrence for the early detection by a prior method of a "black-out" power fault condition.

The performance of the previous AC power failure detection system utilizing peak detections of the AC power voltage waveform is illustrated for two cases in FIG. 2a and FIG. 2b. In the BEST CASE of LOSS OF POWER, such loss of power will occur, as illustrated in FIG. 2a by the interruption of the AC voltage waveform, at but a very small time interval before the voltage waveform would otherwise have crossed a voltage threshold, nominally upper voltage threshold level 10, and would have satisfied the voltage comparator sensing such threshold voltage level crossing. In such a case, the elapsed time between the LOSS OF POWER and a resultant WARNING is but a very small time interval, being a small fraction of the 8 millisecond period of one-half cycle of the 60 Hertz AC power waveform.

An alternative, WORST CASE, performance of the previous power fault detection method in the event of an AC power "blackout" is illustrated in FIG. 2b. In such case, the LOSS OF POWER does occur immediately after the AC power voltage waveform has passed, and satisfied, a voltage threshold, illustrated in FIG. 2b to be the upper voltage threshold 10. Although the power voltage would immediately deteriorate to approximately zero volts, a WARNING resultant from such AC power loss would not occur til approximately one-half cycle later, or nearly 8 milliseconds for 60 Hertz input power. Thus, although the previous method of detecting the crossings of thresholds slightly below the peak level obtained by the input AC power voltage waveform is effective for detection of the "brown-out" power deterioration illustrated in FIG. 1a, the case of a "black-out" power deterioration illustrated in FIG. 2b shows that considerable time may elapse before a detection of this power deterioration condition results in an appropriate warning.

The method and apparatus of the present invention is particularly directed to the detection of the total loss of alternating current power, meaning the "black-out" condition illustrated in FIG. 1b. The method and apparatus is potentially operated concurrently with the previous method and apparatus of detecting peak crossings of the AC power waveform, which previous method, and apparatus, continue to be especially useful for the detection of the "brown-out" power deterioration condition illustrated in FIG. 1a.

Figure 2C:
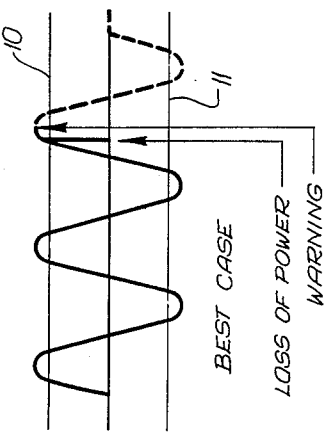
FIG. 2c shows an example of small positive and negative voltage thresholds established for a detector circuit in accordance with the present invention.

The improved method of the present invention for the detection of "black-out" power deterioration condition is based on the fact that the alternating current power voltage waveform passes through zero volts instantaneously, remaining close to zero volts for but a very short period of time twice during each complete power cycle. As an alternate way of expressing this, the change in voltage, $\Delta V$, occurring with change in time $\Delta T$, for a sinusoidal waveform is at a maximum during the zero-crossing of such waveform. In other words, the time derivative, $dV/dT$, of the sinusoidal waveform, or the slope of such waveform, is at a maximum at the zero crossing of the waveform. In accordance with the present invention, two new voltage thresholds 20 and 21 (shown in FIG. 2c) are defined about the zero volt level. The upper, positive, voltage threshold 20 of $+V1$ volts is intended to be but a small fraction, nominally 5%, of the peak positive voltage of the waveform of $+V2$ volts. Likewise, the lower, negative, voltage threshold 21 of $-V1$ volts is intended to be but the same 5% fraction of the negative peak voltage of $-V2$ volts. Under normal conditions as illustrated in FIG. 2, the AC input power voltage waveform will require but a short period of time $\Delta T$ to cross one threshold and to reach the other threshold. Such time period, $\Delta T$, is represented by the following formula:

$$\Delta T = T / \sin^{-1} V1/V2$$

where:
T = The alternating current voltage waveform period.
+V1 = The positive voltage threshold.
−V1 = The negative voltage threshold.
V2 = The AC power waveform peak voltage.

In the case of a "black-out" power deterioration condition as illustrated in FIGS. 1b, 2a and 2b, the AC power voltage waveform will fall, substantially immediately, to a level between voltage threshold 20 and voltage threshold 21, and remain there. The present invention monitors such a situation by arranging a timer to cause an alarm when the input signal remains between such thresholds by a substantially longer period than time $\Delta T$. Clearly the delay in signalling a "black-out" power deterioration in such case is proportional to time $\Delta T$, which, with small voltage thresholds +V1 volts and −V1 volts, will be significantly shorter than one-half period of the AC power.

A limitation in choosing very small and close together voltage thresholds +V1 and −V1, and in resultantly detecting the occurrence of a "black-out" power fault over a very small time ΔT, is that system offset voltages and noise will influence the detection. Such offset voltages and noise will possibly result in a failure to detect "black-out" power deterioration. This failure would result if offset voltages and noise result in the AC power voltage waveform failing to remain within the close voltage thresholds for a sufficiently long period. The illustrated embodiment of the present invention will provide reliable fast detection of power faults without excessive false alarms when used with generally available 60 Hertz AC power. Such implementation employs a positive voltage threshold 20 established at a level +V1 volts equalling approximately 5% of peak positive voltage V2 volts. Likewise, negative voltage threshold 21 of −V1 volts is set at a level equalling approximately 5% of negative peak voltage −V2 volts. At such threshold levels, the normal time ΔT that the AC power voltage waveform spends between such voltage thresholds is about 5% of one-half period of such AC voltage waveform. If the detected time duration that the voltage waveform of the AC power spends between the two voltage thresholds is compared to a time period equal to twice the expected duration (2ΔT), then an alarm resulting from the "black-out" power deterioration condition can still be made in less than one-tenth of one-half of the period (one-twentieth of the overall period) of the AC power. Since the previous peak detection method illustrated in FIG. 1b potentially took up to one-half period for the detection of certain "black-out" power deterioration occurrences arising at a certain phase of the power waveform, the method of the present invention assures that detection of total power loss will be performed up to ten times sooner than the worst case detection of this same occurrence by the previous method.

Figure 3A:
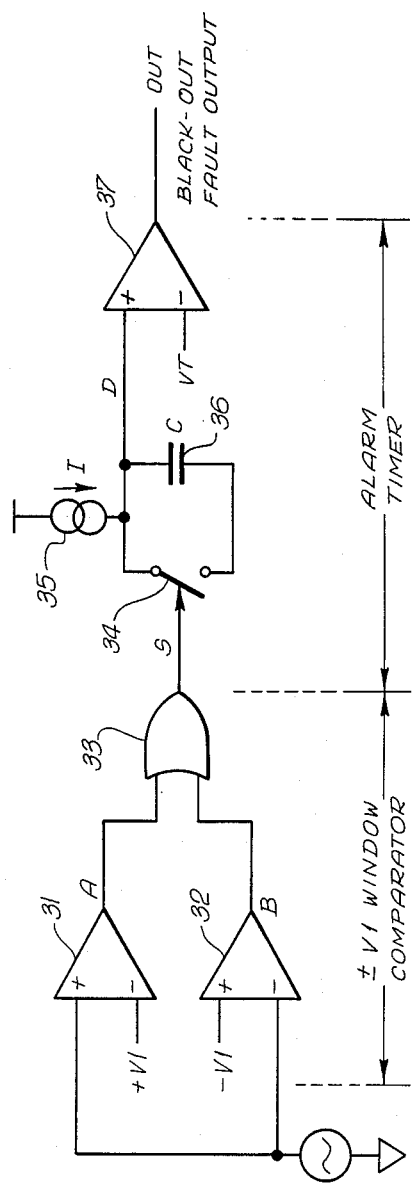
FIG. 3a shows a schematic diagram of one embodiment of a circuit apparatus in accordance with the invention.
Figure 3B:
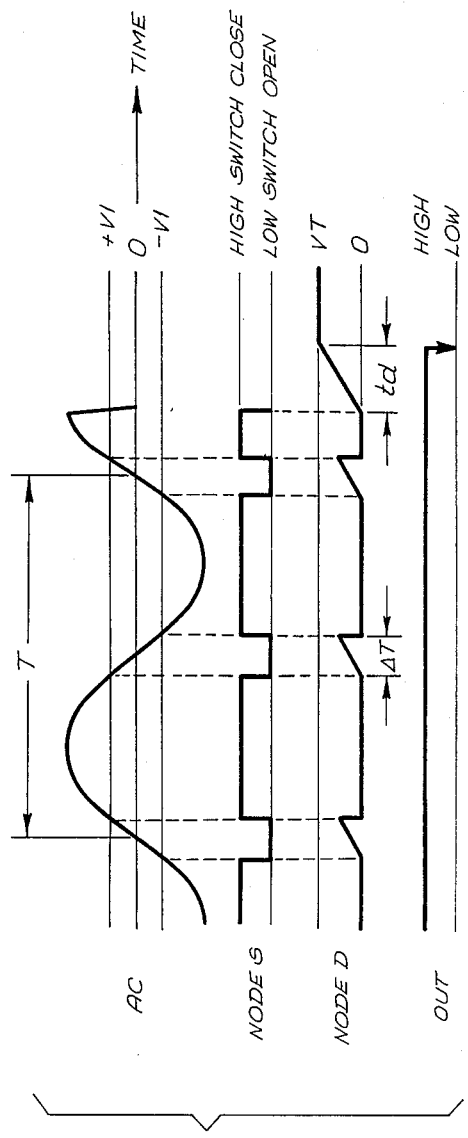

A schematic diagram of the illustrated embodiment of the present invention of an alternating current power loss detector is shown in FIG. 3a. The waveforms pertinent to the actual operation of such circuit are illustrated in FIG. 3b. The source of alternating current power 30 providing voltage waveform AC of period T is simultaneously received at the positive, +, input to a first, positive threshold, differential amplifier 31 and at the negative, −, input to a second, negative threshold, differential amplifier 32. The negative input to the positive threshold differential amplifier 31 is coupled to the positive threshold voltage +V1 volts. The positive input to the negative threshold differential amplifier 32 is coupled to the negative threshold voltage −V1 volts.

By the commonly understood operation of such differential amplifiers, the output signal at node A from positive threshold differential amplifier 31 will be at a logic high condition for such time as the input alternating current power voltage waveform AC is in excess of positive voltage threshold +V1 volts. Likewise, the logic level at output signal node B from the negative threshold differential amplifier 32 will be at a logic high condition for such time as the AC power voltage waveform AC is more negative than negative voltage threshold −V1 volts. The combination of signals upon nodes A and B in OR gate 33 results in the signal at NODE S. This signal is shown in FIG. 3b to be high save during those periods, normally of duration ΔT, wherein the voltage waveform of the input power is between the voltage thresholds at the region of zero crossing (twice each cycle). Consequently, in aggregate, elements 31–33 may be considered to comprise a WINDOW COMPARATOR, the purpose of which window comparator is to detect all times upon which the voltage waveform of the input AC power is within, and without, the region established by the voltage thresholds.

The second portion of the illustrated embodiment circuit of the present invention shown in FIG. 3a is the ALARM TIMER portion. Such portion acts to cause an alarm, being the low condition of signal OUT which is the BLACK-OUT FAULT OUTPUT, during times of interruption of input AC power. The circuit receives the comparator signal arising at NODE S to perform this function in the following manner. The low condition of such signal at NODE S causes a switch 34 to open, which allows a current source I 35 to commence charging a capacitor C 36. Such buildup of charge will have the characteristics illustrated by the voltage waveform shown for NODE D in FIG. 3b. During normal periods of zero crossing, the charge buildup upon the capacitor C 36 at NODE D will not exceed reference voltage VT. Such voltage upon NODE D is compared to such reference voltage VT by a differential amplifier 37. The normal output of such differential amplifier 37, during all periods of regular continuance of the input AC power, will be a high signal OUT, BLACK-OUT FAULT OUTPUT. If, as is illustrated in FIG. 3b, the input power waveform undergoes a black-out fault by falling to and remaining at zero volts (which is between threshold −V1 volts and V1 volts), then the low condition of the signal at NODE S will hold switch 34 open, allowing the continuous buildup of voltage on capacitor C 36 by current source I 35 as illustrated for NODE D. At such time as the voltage, increasing at a rate of dV/dT=I/C, does exceed threshold level VT, then the signal OUT from differential amplifier 37 will go low, indicating the occurrence of a "black-out" power fault condition. The time during which the signal at NODE D will rise to such threshold level voltage VT is approximately T=C×VT/I.

Figure 4A:
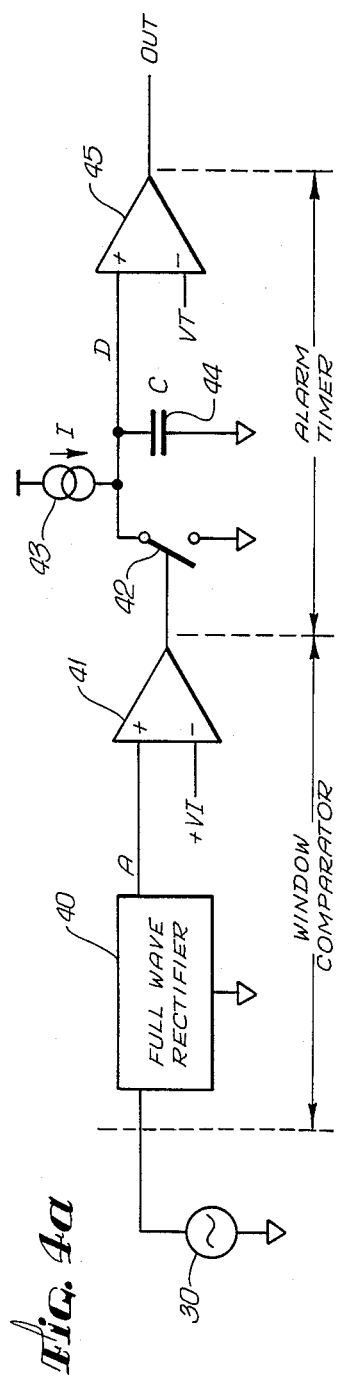
FIG. 4a shows a schematic diagram of an alternative embodiment of a circuit apparatus in accordance with the present invention.
Figure 4B:
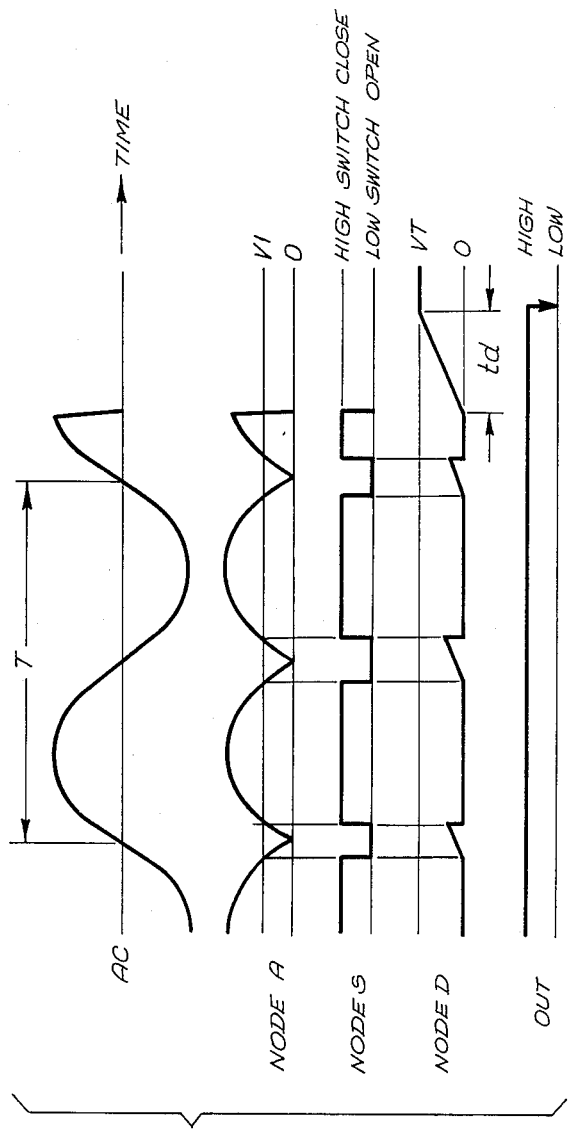

An alternative embodiment of the present invention is shown in FIG. 4a, with an accompanying diagram of pertinent waveforms in the operation of such variant embodiment shown in FIG. 4b. The source of AC power 30 produces voltage waveform AC which is rectified in FULL WAVE RECTIFIER 40 to produce a full wave rectified signal at NODE A. This signal, positive only, is compared to the single positive voltage threshold +V1 volts in differential amplifier 41. For all times during which the full wave rectified AC signal is in excess of such threshold voltage of +V1 volts, then the signal output at NODE S will assume a logic high condition. Conversely, during such times as the original AC voltage waveform is undergoing zero crossing and exhibits an absolute magnitude of less than +V1 volts, then the signal output at NODE S will assume a logic low condition. The logic high condition at NODE S does cause switch 42 to close, whereas the logic low condition at NODE S does cause switch 42 to open. As before, the ALARM TIMER operates to allow current source I 43 to charge capacitor C 44 during the open condition of switch 42, building up voltage on NODE D at a rate of dV/dT =I/C. The voltage at NODE D is constantly compared in differential amplifier 45 to reference voltage VT, the signal OUT assuming the low condition, indicative of fault, if such threshold voltage VT volts is exceeded by the voltage at NODE D. Such an occurrence is again illustrated in FIG. 4b to arise upon the "black-out" interruption of the input AC power. In such a case, the signal at NODE S will go, and remain, in a low condition causing that switch 42 should remain open. After a period of time TD=C×VT/I, the voltage at node D will exceed threshold VT, enabling differential amplifier 45 to produce a low signal OUT, which low condition of the signal OUT is indicative of an input power fault.

Therefore in accordance with the preceding description of two variant embodiments, the present invention should be perceived to generally provide a method, and apparatus, for detecting the time duration that an alternating current power voltage waveform spends between two voltage thresholds, nominally centered about zero volts, and, responsively to such detecting, for producing an alarm if such time duration exceeds a predetermined reference time duration. Each of the voltage thresholds and the reference time duration may be individually specified and predetermined. Furthermore, it is possible, by the well-understood time constant of charging a capacitive circuit, to use a comparison of the voltage buildup upon such capacitor to a reference voltage in order to determine whether the duration of time which has elapsed since such charge buildup was enabled has exceeded a reference time duration.

Obviously, there are alternative implementations possible in the realization of the method of the present invention. For example, the alarm time portion of the circuit of the present invention need not utilize an analog circuit for detection of a time interval (via the charging of a capacitor), but could have used a digital timer referencing an external clock frequency. Likewise, the window comparator portion of the circuit need not have been implemented with analog circuitry, but, if the original AC power voltage waveform had been digitized, could have been implemented in digital circuitry. In such a case all subsequent comparison of, and to, such waveform could have been performed digitally.

The two embodiments of the invention represent economical, analog, implementations of the function of the invention. These implementations may be entirely emplaced upon one component as monolithic integrated circuitry. Particularly in such monolithic implementations the circuit of the present invention is widely and readily applicable to diverse applications requiring the sensing of AC power in electrical and electronic devices. Therefore, the present invention should be construed broadly, in accordance with the claims which follow, as opposed to being construed only within the context of those embodiments within which such invention has been taught.

What is claimed is:

1. An apparatus for detecting the loss of alternating current power comprising:
   first and second comparator means, each comparator means having a signal input, a reference input, and a signal output; and
   means for applying the alternating current power to said signal input of said first nd second comparator means and for applying a first reference voltage to said reference input of said first comparator means and a second reference voltage to said reference input of said second comparator means for generating at the signal output of said first and second comparator means a signal representative of the transition time of the voltage waveform of alternating current power between said first reference voltage and said second reference voltage; and
   means coupled to the signal output of said first and second comparator means for receiving the signal and for producing an alarm signal if the transition time is greater than a predetermined time;
   wherein each of the first reference voltage and the second reference voltage are less than fifteen percent of the peak voltage of the voltage waveform.

2. The apparatus according to claim 1 wherein the first reference voltage is positive and the second reference voltage is negative.

3. The apparatus according to claim 2 wherein the magnitude of the first reference voltage equals the magnitude of the second reference voltage.

4. An apparatus for detecting the loss of alternating current power comprising:
   first and second comparator means, each comparator means having a signal input, a reference input, and a signal output; and
   means for applying the alternating current power to said signal input of said first and second comparator means and for applying a first reference voltage to said reference input of said first comparator means and a second reference voltage to said reference input of said second comparator means for determining the transition time of an alternating current power voltage waveform through a voltage window defined by said first reference voltage and said second reference voltage; and
   means, coupled to the signal output of said first and second comparator means and being responsive to the determined transition time, for producing a signal indicating loss of alternating current power if the transition time exceeds a predetermined time;
   wherein each of said first reference voltage and said second reference voltage are less than fifteen percent of the peak voltage of the voltage waveform.

5. The apparatus according to claim 4 wherein the first reference voltage is positive and the second reference voltage is negative.

6. The apparatus according to claim 5 wherein the magnitude of the first reference voltage equals the magnitude of the second reference voltage.

7. An apparatus for detecting loss of alternating current power comprising:
   first and second comparator means, each comparator means having a signal input, a reference input, and a signal output; and
   means for applying the alternating current power to the signal input of said first and second comparator means and for applying a first threshold voltage to the reference input of said first comparator means and a second threshold voltage to the reference input of said second comparator means.
   means coupled to the signal output of said first and second comparator means for producing an indication signal responsive to a duration of time during which the voltage of alternating current power is between said first and second threshold voltages, each threshold voltage being less than fifteen percent of the peak voltage value of said alternating current power; and
   means, receiving said indication signal, for producing an alarm signal if said duration of time is greater than a predetermined duration of time.

8. The apparatus of claim 7 wherein said first and second threshold voltages are positive and negative relative to zero volts.

9. The apparatus of claim 7 wherein said means for producing an indication signal further comprises:
   means for producing a first signal when said voltage of alternating current power is of higher voltage than a greater of said first and second threshold voltage;
   means for producing a second signal when said voltage of alternating current power is of lower voltage than a lesser of said two voltage thresholds; and
   combining means for receiving said first signal and said second signal and for producing said indication signal during a duration of time that said voltage of alternating current power is of voltage higher than said lesser of said two voltage thresholds and of voltage lower than said greater of said first and second threshold voltages.

10. The apparatus of claim 7 wherein said means for producing an alarm signal further comprises:
    means for accumulating, voltage charge during the duration of said indication signal; and
    means responsive to said means for accumulating voltage charge and to a predetermined reference voltage for producing said alarm if said accumulated voltage charge exceeds said predetermined reference voltage.

11. An apparatus for detecting the loss of alternating current power comprising:
    comparator means having a signal input, a reference input, and a signal output;
    means for directly applying via non voltage-offsetting means the alternating current power to said signal input of said comparator means and for applying a reference voltage to said reference input of said comparator means for determining the transition time of an alternating current power voltage waveform through a voltage window defined by said reference voltage and zero volts; and
    means, responsive to the determined transition time, for producing a signal indicating loss of alternating current power if the transition time exceeds a predetermined time;
    wherein said reference voltage is less than 15% of the peak voltage of the voltage waveform.

12. A method of detecting interruption of alternating current power comprising:
    comparator means for detecting the duration of time between crossings of two voltage levels by an alternating current power waveform, said comparator means having a signal input to which is directly applied via non voltage-offsetting means said alternating current power, a reference input to which is applied a reference voltage and a signal output for producing a signal having a given value for the duration of time the alternating current power has a magnitude which is less than said reference voltage, each voltage level being less than fifteen percent of the peak voltage of said waveform; and
    producing an alarm signal if said duration of time is greater than a predetermined reference duration of time.

13. An apparatus sensitive to a change in voltage, $\Delta V$, for detecting therefrom elapsed time, $\Delta T$, in an alternating current power voltage waveform, said apparatus comprising:
    first threshold detecting means including a first differential amplifier, having first and second inputs and an output, for detecting a first condition when said alternating current voltage waveform is of voltage less than a negative threshold, $-VT$, which negative voltage threshold is less than 50% of the peak negative value of said alternating current power voltage waveform, said alternating current power voltage waveform being applied to said first input of said first differential amplifier and a voltage equal to $-VT$ being applied to said second input of said second differential amplifier;
    second threshold detecting means including a second differential amplifier having first and second inputs and an output for detecting a second condition when said alternating current power voltage waveform is of voltage greater than a positive voltage threshold, $+VT$, which positive voltage threshold is less than 50% of the peak positive value of said alternating current power voltage waveform, where $VT-(-VT)=\Delta V$; and
    combining means responsive to said detecting of said first condition and said second condition for producing a signal during the elapsed time, $\Delta T$, that said alternating current power voltage waveform has a voltage amplitude greater than $-VT$ and less than $+VT$.

14. The apparatus according to claim 13 wherein $-VT$ is approximately 5% of the peak negative voltage value of said alternating current power voltage waveform;
    $+VT$ is approximately 5% of the peak positive voltage value of said alternating current power voltage waveform; and
    the voltage waveform of the alternating current power is sinusoidal;
    whereby $\Delta T$ is approximately 5% of one-half period of a sinusoidal of said alternating current power voltage waveform.

15. The apparatus according to claim 6 wherein said first comparator means is a first differential amplifier and wherein said second comparator means is a second differential amplifier.

* * * * *